March 19, 1968 H. R. K. N. JANESCHITZ-KRIEGL ET AL 3,374,296
THERMOPLASTIC EXTRUSION PROCESS
Filed Jan. 22, 1964
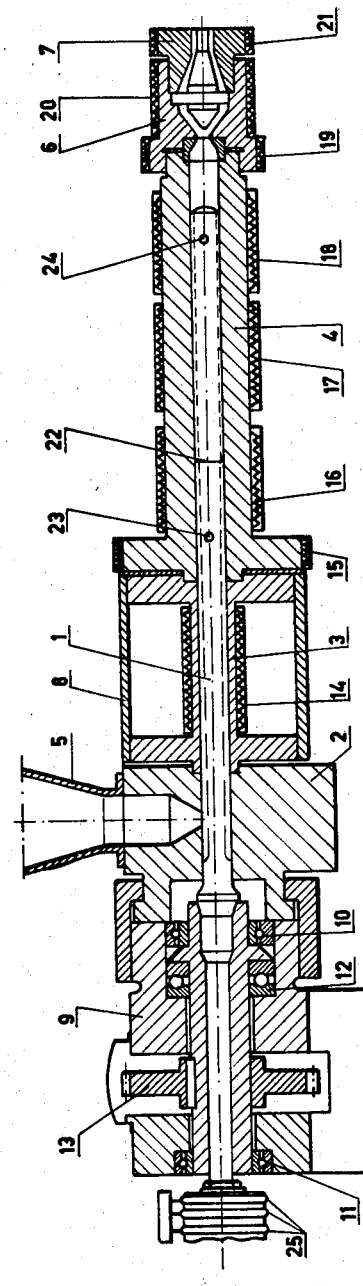

3,374,296
THERMOPLASTIC EXTRUSION PROCESS

Hermann R. K. N. Janeschitz-Kriegl, Delft, and Johannes Schijf and Johannes A. M. Telgenkamp, The Hague, Netherlands, assignors to Nederlandse Organisatie Voor Toegepast-Natuurwetenschappelijk Onderzoek ten Behoeve van Nijverheid, Handel en Verkeer, a corporation of the Netherlands
Filed Jan. 22, 1964, Ser. No. 340,116
Claims priority, application Netherlands, Feb. 6, 1963, 288,647
1 Claim. (Cl. 264—40)

This invention relates to a method for the extrusion of thermoplastic synthetic resins with a screw extruder.

It is desirable that synthetic resin be heated vigorously in the melting zone in order to have the process of melting proceed as fast as possible, since the volume of the zone decreases with each turn of the screw. In the metering zone where the screw has a constant thread, there is no further need for heat; it is even possible, that owing to the conversion of the mechanical energy of the screw into frictional heat, a further rise in temperature will occur, which may be so great as to risk decomposition of the synthetic resin.

A screw extruder is often provided with a heating and cooling device, by means of which the temperature of the extruder cylinder in the metering zone may be adjusted to a fixed value, and in which a heating device is provided for the necessary heat supply in the melting zone which can be controlled independently of it.

It is important, when extruding with a screw extruder constructed in the way described, that the heat supply in the melting zone be adjusted to the correct value. Excessive heat supply will give rise to an excess of temperature in the mass, which may cause decomposition in the melting zone; whereas a deficient heat supply will bring about a retardation of the melting process which will cause the temperature of the mass to remain too low.

This problem arises when handling synthetic resins which can only be treated within a narrow range of temperature, because the temperature below the synthetic resin is insufficiently plastic and the temperature above which decomposition occurs are close together.

Owing to the large heat supply and poor heat conductivity of synthetic resins, it is not possible to measure the temperature of the mass in the melting zone and then use this to control the heat supply.

It is an object of the invention to provide a method of extrusion of synthetic resins, by which the above-described problem is solved.

According to the invention the temperature of the screw is measured near the beginning of the metering zone and near its end, and the heat supply in the melting zone is controlled in such a manner that these two temperatures have the same or substantially the same value.

Thus, the synthetic resin suffers no further change in temperature within the metering zone and the heat supply in the melting region is just sufficient to reach the required temperature.

Another problem is also solved by the method according to this invention.

It is important to know the temperature of the plastic mass at the end of the extruder cylinder, because the quality of the final product is to a high degree dependent on this. However, as there is a difference in temperature between the mass and the extruder cylinder, owing to the removal of the frictional heat developed in the screw thread, and as this difference in temperature owing to the poor heat conductivity of the synthetic resin may be considerable, a reliable measurement of the temperature of the mass is impossible while using known methods.

When using the method according to this invention however, the screw has the same temperature at two measuring points situated at some distance from one another, so that no conduction of heat by the screw occurs. Thus, the temperature of the screw corresponds to the temperature of the mass.

The invention also relates to a screw extruder for carrying out the method described, which screw extruder is characterized in that the screw, near the beginning of the metering zone and near its end, is provided with a thermoelectric element for measuring the temperature. These elements can be connected with an indicating measuring instrument, so that it is possible, if necessary, to correct the heat supply in the melting zone with the aid of the deflection. Preferably, however, the elements are connected with an automatic control device, which increases the heat supply when the first element has a lower temperature than the second, or the reverse.

The place which is most suitable for practical application of the first thermoelectric measuring element is, in most cases, situated before the metering zone and in some cases even half-way along the melting zone.

The screw extruder comprises a screw 1 and an extrusion cylinder, built up from a filling section 2, on which is provided the funnel 5, a thin-walled intermediate section 3 and the extruder cylinder 4, on to which are fixed the extruding nozzle 6 and the die 7. The intermediate section 3 is reinforced by the sleeve 8.

The extruder cylinder is fixed to the casing 9, in which the screw 1 is supported by the bearings 10, 11 and 12, and in which the driving gear for the screw 1 is accommodated. The toothed wheel 13 on the shaft of the screw 1 is the extent to which the drawing shows the driving gear. The intermediate section 3 and the extruder cylinder 4 are provided with electrical heating devices 14, 15, 16, 17 and 18 respectively; whereas the extruding nozzle 6 and the die 7 are provided with similar heating devices 19, 20 and 21 respectively.

There are also provided means, not represented in the drawing, for cooling the extruder cylinder 4 externally by means of an air stream.

The screw 1 has a thread, which, beginning from the filling section 2 in the direction of the extruding nozzle 6 as far as the line 22 has a decreasing volume for each turn. This is the so-called melting zone of the screw. The part of the screw between the line 22 and the screw end has a constant screw thread and forms the metering zone of the screw.

The screw 1 and its shaft are hollow and encase a thin-walled metal tube, in which are provided two thermocouples 23 and 24. The thermocouple 23 is situated near the boundary 22 between the melting zone and the metering zone, and the thermocouple 24 near the end of the screw 1. Collector rings 25 are provided on the shaft of the screw 1, by means of which rings the thermocouples 23 and 24 can be connected electrically with a measuring instrument or a control device, which controls the heating device 14.

The operation of the screw extruder is as follows:

The synthetic resin which is to be processed is supplied in finely divided form by way of the funnel 5 to the screw 1, which conveys the material in the direction of the extruder nozzle 6. In the intermediate section 3 the material is heated, so that it is plasticized. The volume occupied by the material is reduced, which again is compensated by the reduction of the screw thread in this section of the screw.

Subsequently, the material is carried by way of the extruder nozzle 4, which is kept at a constant temperature by means of the heating elements 15, 16, 17, 18 and the cooling means not shown in the drawing, to the extruding nozzle 6 and the die 7, the temperature of which is also kept constant.

The intense heating of the intermediate section 3 causes its temperature to rise considerably above that of the extruding nozzle 4, so that the difference in temperature may amount to 50°C. and even more. In view of this fact, the intermediate section 3 of the thin-walled constructions, which reduces conduction of heat towards the extruding nozzle 4, which might upset its temperature control.

The voltage from the thermocouple is conducted by collector rings 25 and the sliding contacts belonging to them, to a millivoltmeter, with which the difference in temperature between the two thermocouples 23 and 24 can be read.

When thermocouple 23 appears to have a lower temperature than thermocouple 24, the heat supply from the heating device 14 is increased to reduce the temperature difference to zero or practically zero. Conversely, the heat supply is reduced, when the temperature of thermocouple 23 appears to be higher than that of thermocouple 24.

When they are equal, the voltages of the two thermocouples are at the same time an accurate indication of the temperature of the synthetic resin in the extruder cylinder 4. The temperature of the synthetic resin can be adjusted to any required value in a simple manner, by the temperature of the extruder cylinder 4, which is lower than that of the synthetic resin owing to the removal of the frictional heat.

It has proved to be possible, when using the above described device, for synthetic resins having a very narrow temperature range, for instance 15° C., inside of which processing must take place, to be processed without difficulty, and for a rapid correct adustment of the apparatus.

We claim:
1. A process for controlling the heat supply to the melting zone of a thermoplastic synthetic resin screw extruder comprising
    (a) measuring the difference in temperature between two separately located sensing devices at both ends of a metering zone;
    (b) maintaining the outer cylinder wall of the metering zone of said screw extruder at a constant temperature; and
    (c) supplying heat to the melting zone of said extruder in response to a change in the difference in temperature between said sensing devices.

References Cited

UNITED STATES PATENTS

| | | | |
|---|---|---|---|
| 3,068,513 | 12/1962 | Chaffin | 264—176 |
| 3,143,584 | 8/1964 | Roberts et al. | 264—176 |
| 2,353,825 | 7/1944 | Hofmann | 18—5 |
| 2,789,313 | 4/1957 | Knowles | 18—5 |
| 2,541,201 | 2/1951 | Buecken et al. | 264—176 |
| 2,653,348 | 9/1953 | Elgin et al. | 18—12 |
| 2,721,729 | 10/1955 | Riper. | |
| 2,722,716 | 11/1955 | Henning | 18—12 |

ALEXANDER H. BRODMERKEL, *Primary Examiner.*

J. H. WOO, *Assistant Examiner.*